United States Patent
Machate (10) Patent No.: US 10,162,097 B2
(45) Date of Patent: Dec. 25, 2018

(54) OPTICAL SYSTEM, AND ASSEMBLY FOR EMITTING LIGHT

(71) Applicant: ZUMTOBEL LIGHTING GMBH, Dornbirn (AT)

(72) Inventor: Andreas Machate, Wangen im Allgau (DE)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 0 days.

(21) Appl. No.: 15/564,454

(22) PCT Filed: Apr. 14, 2016

(86) PCT No.: PCT/EP2016/058207
§ 371 (c)(1),
(2) Date: Oct. 5, 2017

(87) PCT Pub. No.: WO2016/166203
PCT Pub. Date: Oct. 20, 2016

(65) Prior Publication Data
US 2018/0081106 A1    Mar. 22, 2018

(30) Foreign Application Priority Data
Apr. 16, 2015    (DE) .................... 20 2015 101 870 U (51) Int. Cl.
*F21V 8/00*    (2006.01)

(52) U.S. Cl.
CPC ............. *G02B 6/005* (2013.01); *G02B 6/002* (2013.01); *G02B 6/0045* (2013.01);
(Continued)

(58) Field of Classification Search
CPC ...... G02B 6/005; G02B 6/002; G02B 6/0045; G02B 6/0055; G02B 6/0068
(Continued)

(56) References Cited

U.S. PATENT DOCUMENTS

| 5,748,828 A | 5/1998 | Steiner et al. |
| 6,011,602 A | 1/2000 | Miyashita et al. |

(Continued)

FOREIGN PATENT DOCUMENTS

| DE | 102010044424 | 8/2012 |
| DE | 10 2012 215640 | 6/2017 |

(Continued)

OTHER PUBLICATIONS

German search report dated Dec. 10, 2015 in German priority application 20 2015 101 870.3.

(Continued)

*Primary Examiner* — Karl D Frech
(74) *Attorney, Agent, or Firm* — Andrus Intellectual Property Law (57) ABSTRACT

An optical system for influencing a light has a first optical element (1), by means of which a plane (E) is defined, wherein the first optical element (1) has a lateral edge region (11) designed for the entry of the light, and a second optical element (2), wherein the second optical element (2) is arranged parallel to the first optical element (1) and has a light outlet region (21) for the exiting of the light. The lateral edge region (11) of the first optical element (1) is designed to reduce the glare of or bundle the light in the plane (E), and the second optical element (2) has a elongate lens element (3), which extends along a longitudinal axis (L) and is designed to reduce the glare of or bundle the light in an additional plan (E'), which is oriented at least substantially perpendicularly to the plane (E) mentioned first.

19 Claims, 9 Drawing Sheets

(52) U.S. Cl.
CPC ......... *G02B 6/0053* (2013.01); *G02B 6/0055* (2013.01); *G02B 6/0066* (2013.01); *G02B 6/0068* (2013.01); *G02B 6/0073* (2013.01)

(58) Field of Classification Search
USPC .......................................................... 362/606
See application file for complete search history.

(56) References Cited

U.S. PATENT DOCUMENTS

| | | |
|---|---|---|
| 2004/0012946 A1 | 1/2004 | Parker et al. |
| 2004/0085749 A1 | 5/2004 | Parker et al. |
| 2005/0174803 A1 | 8/2005 | Hayashi et al. |
| 2005/0254771 A1 | 11/2005 | Yamashita et al. |
| 2005/0270798 A1 | 12/2005 | Lee et al. |
| 2007/0223247 A1* | 9/2007 | Lee .................... G02B 5/045 362/606 |
| 2007/0279933 A1 | 12/2007 | Shiau et al. |
| 2011/0255303 A1 | 10/2011 | Nichol et al. |
| 2012/0140352 A1 | 6/2012 | Morgan |
| 2012/0294037 A1 | 11/2012 | Holman et al. |
| 2013/0129282 A1 | 5/2013 | Li |
| 2016/0054508 A1* | 2/2016 | Hirayama ............ G02B 6/0038 349/65 |

FOREIGN PATENT DOCUMENTS

| | | |
|---|---|---|
| EP | 1 110 030 | 3/2005 |
| EP | 1 306 610 | 5/2006 |

OTHER PUBLICATIONS

PCT search report dated Jun. 28, 2016 in parent PCT application PCT/EP2016/058207.

Austria search report dated Aug. 7, 2018 in co-pending Austria application 3 GM 266/2015-1.

\* cited by examiner

OPTICAL SYSTEM, AND ASSEMBLY FOR EMITTING LIGHT

CROSS REFERENCE TO RELATED APPLICATION

The present application is the U.S. national stage application of International Application PCT/EP2016/058207, filed Apr. 14, 2016, which international application was published on Oct. 20, 2016 as International Publication WO 2016/166203 A1. The International Application claims priority to German Patent Application 20 2015 101 870.3 filed Apr. 16, 2015.

FIELD OF THE INVENTION

The invention relates to an optical system that influences light emitted from a light source, and an assembly for emitting light with such an optical system.

BACKGROUND OF THE INVENTION

A lighting system having a substantially plate-shaped waveguide and, likewise a, substantially plate-shaped anti-glare unit is known from DE 10 2012 215 640 A1. The anti-glare unit is disposed parallel to and beneath the waveguide. Furthermore, the lighting system comprises an LED light source (LED: light emitting diode) for generating a light that shines into the waveguide at one side. Structures are formed on the undersurface of the waveguide that project downward, in the shape of a cube for example, via which the light exits the waveguide. Collimating elements are formed on the upper surface of the anti-glare unit, each of which is dedicated to one of the structures, such that the light then enters the anti-glare unit via these collimating elements. Lastly, the light leaves the lighting system via the undersurface of the anti-glare unit.

The collimating elements eliminate the glare of the light. For this, they are basically cone-shaped, having a circular or rectangular base. They have a recess on their upper surface, in which the respective dedicated structure is disposed such that it engages therein. This configuration, however, results in only a certain portion of the light exiting the waveguide plate via the structures. A not insignificant portion of the light is conducted past the structures by the waveguide, such that it then experiences other types of interactions, such that it is not emitted via the undersurface of the anti-glare unit. As a result, the efficiency of the lighting system is significantly limited. Furthermore, the formation of the collimating elements requires a comparatively high production effort.

The object of the invention is to create an improved optical system, or an improved assembly for light emission in this regard; in particular, it should provide a particularly high level of efficiency in terms of lighting technology, with simple production means.

This object is achieved in accordance with the invention as described herein.

SUMMARY OF THE INVENTION

In accordance with the invention, an optical system for influencing light from a light source is provided, which has a first optical element that is basically plate-shaped, such that the first optical element establishes a plane, wherein the first optical element has a lateral edge region configured for the entry of the light. Moreover, the system has a second optical element that is basically plate-shaped, wherein the second optical element is disposed parallel to the first optical element, and has a light emission region for emitting the light. The lateral edge region of the first optical element is configured to reduce the glare of the light, or to bundle the light in the plane; the second optical element has at least one elongated lens element extending along a longitudinal axis and configured to reduce the glare, or bundle the light in another plane that is substantially perpendicular to the first plane.

Because the glare reduction in the first plane is already caused by the lateral edge region of the first optical element, the elongated lens element need only be configured for glare reduction in the other plane, thus in only one plane. This results in boundary conditions that significantly simplify production of the system. By way of example, the lens element can be molded.

Furthermore, as a result of the elongated shape of the lens element, the first optical element can be formed with a comparably large light emission region, via which the light exits the first optical element and then enters the second optical element via the at least one elongated lens element. The efficiency is improved in this manner.

The at least one elongated lens element preferably has a groove extending parallel to the longitudinal axis, which is configured for light entry and is formed on a side of the second optical element facing toward the first optical element. The light can be transferred particularly effectively through the groove from the first optical element to the second optical element.

The groove preferably extends in both directions to the edge of the second optical element. This results in a comparatively larger light transfer region, such that it is particularly efficient. Furthermore, the lens element is easier to produce when the groove extends to both ends of the lens element.

The at least one elongated lens element preferably has diverging outer boundaries in a cross section perpendicular to the longitudinal axis. This shape enables a particularly effective bundling of the light into the other plane.

The first optical element preferably has at least one elongated structure, parallel to the longitudinal axis, for light emission. This shape makes the first optical element easier to produce. By way of example, the elongated structure can extend in both directions to the edge of the first optical element. Furthermore, a comparatively larger light transfer region is formed between the two optical elements in this manner.

Preferably, the configuration is such that—when seen in a perpendicular projection onto the plane—the at least one elongated structure and the at least one elongated lens element overlap at least in part, preferably such that the elongated structure lies within the projection of the at least one elongated lens element. In this manner, a particularly low loss light transfer from the first optical element to the second optical element can be obtained with an advantageous use of space.

Furthermore, the configuration is preferably such that the elongated structure engages in the groove. Furthermore, the shape of the elongated structure is preferably congruent to the shape of the groove, seen in a cross section perpendicular to the longitudinal axis. This also has advantages regarding a particularly effective light transfer. By way of example, the elongated structure can be rectangular, seen in a cross section perpendicular to the longitudinal axis.

The second optical element preferably has numerous elongated lens elements that are parallel to one another, and preferably bordering directly on one another. This results in a particularly large light emitting surface of the second optical element.

The first optical element preferably has numerous elongated structures for light emission, which are parallel to one another, wherein each of the lens elements is dedicated to precisely one of the elongated structures. This is also advantageous in terms of efficiency.

An assembly for emitting light is provided in accordance with another aspect of the invention, which has a light source for generating a light, and an optical system according to the invention. The assembly is configured such that the light generated by the light source is influenced by the optical system.

The light source is preferably an LED light source. The optical system is particularly well suited for this.

The assembly preferably also has at least one further light source, wherein the light enters the first optical element from different sides through the first light source and the at least one further light source. In this manner, a more homogeneous light can be emitted via the second optical element.

The assembly preferably also includes a reflector element, disposed opposite the second optical element in relation to the first optical element.

BRIEF DESCRIPTION OF THE DRAWINGS

The invention shall be explained below in greater detail based on an exemplary embodiment and with reference to the drawings. Therein.

DETAILED DESCRIPTION

Figure 1:
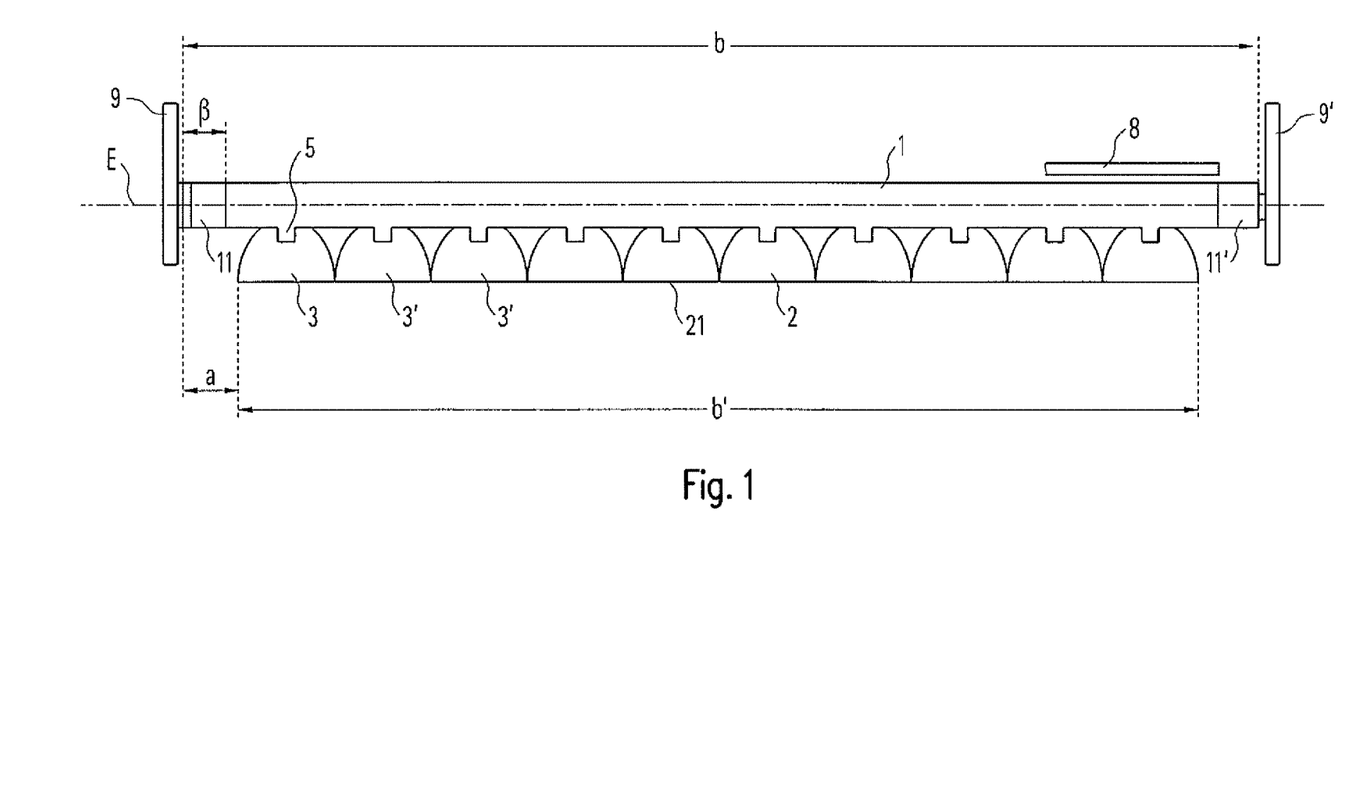
FIG. 1 shows a cross sectional illustration of an assembly for emitting light according to the invention.
Figure 2:
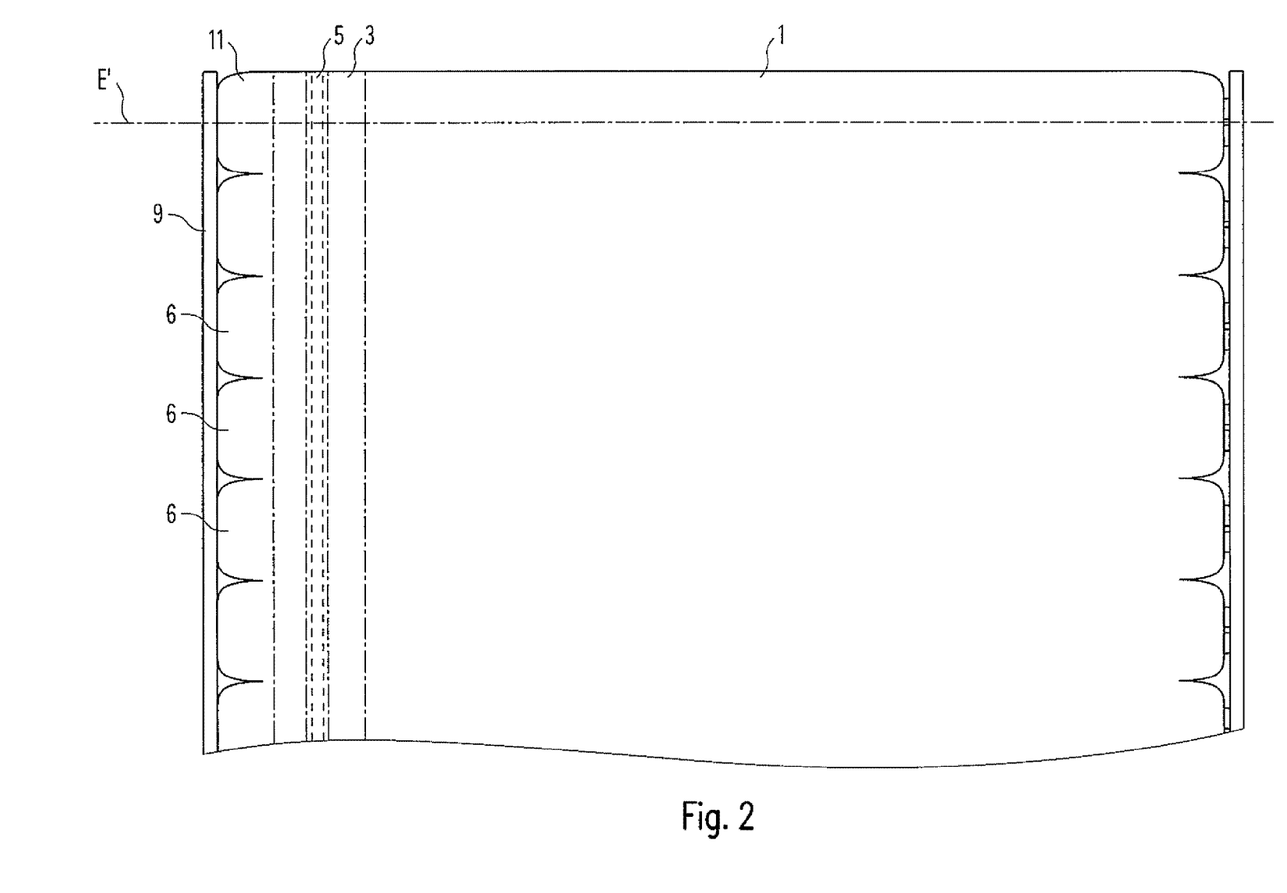
FIG. 2 shows an illustration of a top view of a part of the assembly.

FIG. 1 shows a cross sectional illustration of an assembly according to the invention for emitting light, FIG. 2 shows an illustration of a top view of a part of the assembly. The assembly comprises an optical system according to the invention, for influencing a light emitted from a light source 9. The light source 9 is part of the assembly according to the invention thereby.

The optical system comprises a first optical element 1, which is basically plate shaped, such that the plate defines a plane E. In this description, it is assumed that the first optical element 1 is horizontal, and the plane E is accordingly horizontal. In general, however, the assembly can also be operated with other orientations of the first optical element 1 in relation to the vertical axis. In this case, the present directional information, etc. must be reinterpreted.

Figure 7:
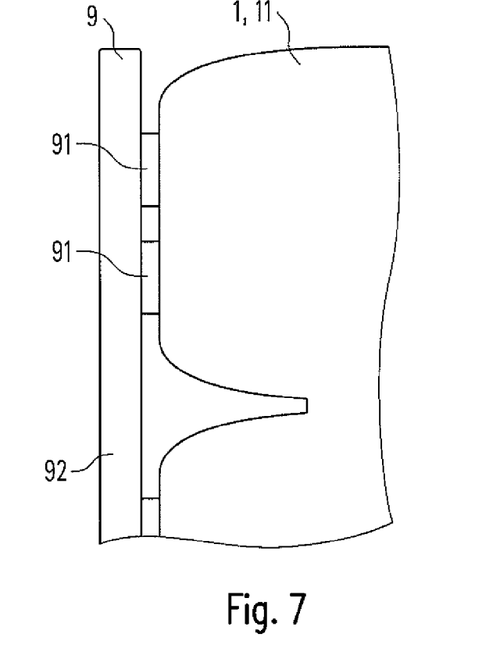
FIG. 7 shows an illustration of a top view of a part of the lateral edge region of the first optical element.

FIG. 7 shows a detail of the illustration in FIG. 2. In this example, the light source 9 comprises numerous LEDs 91 disposed in a row along a straight line, which are preferably disposed on a printed circuit board 92. The light source 9 is configured and positioned such that the LEDs 91 lie in the plane E, or are disposed such that they pass through the plane E.

The first optical element 1 is composed at least in part of a transparent material, e.g., advantageously in terms of production, a plastic. The first optical element 1 has a lateral edge region 11, configured for the entry of the light emitted from the light source 9.

Figure 9:
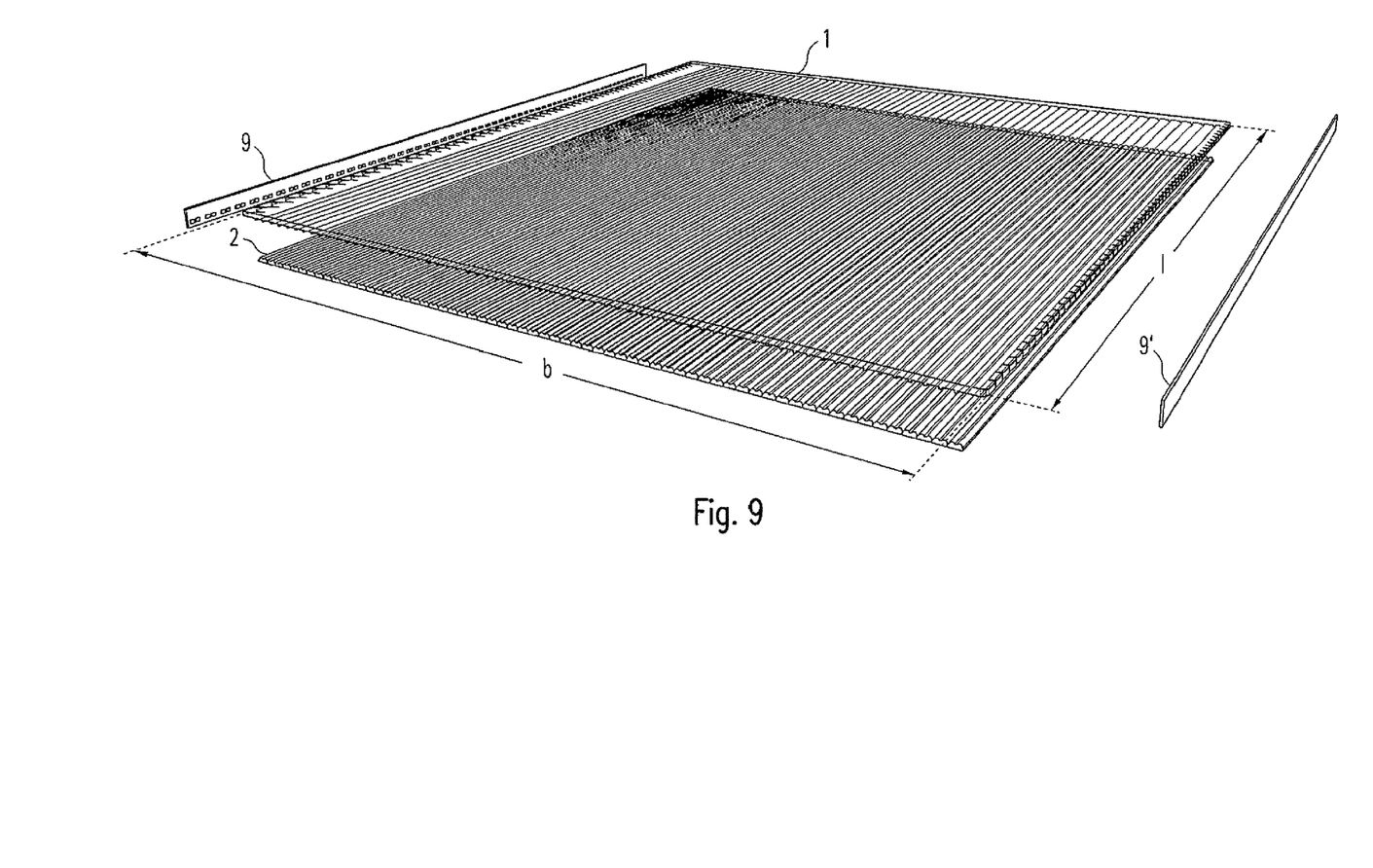
FIG. 9 shows a perspective illustration of the assembly.

A perspective illustration of the assembly is shown in an exploded view in FIG. 9. As can be seen therein, the first optical element 1 can have a basically rectangular form, seen from above, such that it has four edges, wherein the lateral edge region 11 is formed on one of these edges. In the example shown here, the first optical element 1 has a length 1 and a width b, wherein the edge region 11 is formed on one of the two longitudinal sides.

The printed circuit board 92 with the LEDs 91 preferably extends along the edge region.

Figure 5:
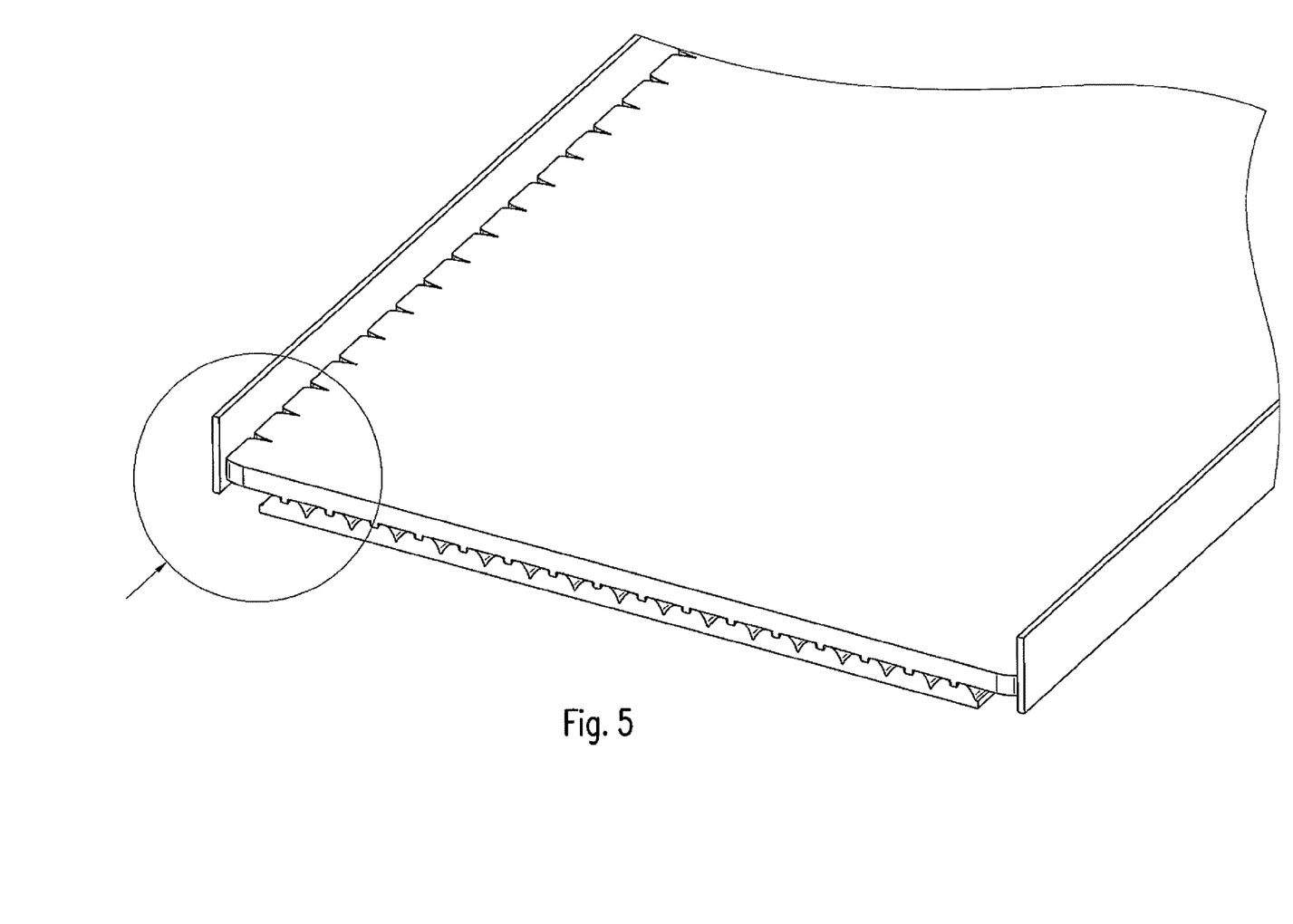
FIG. 5 shows a perspective illustration of a larger region of the assembly.
Figure 6:
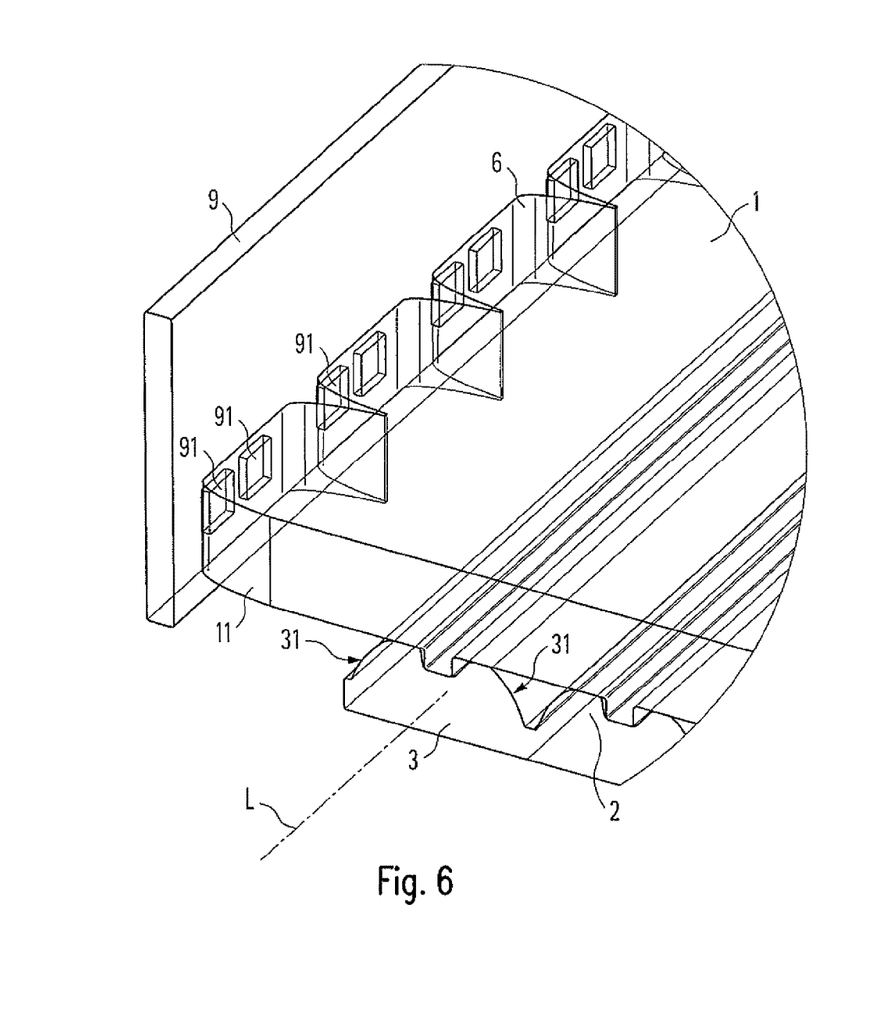
FIG. 6 shows a detail from the illustration in FIG. 5.

FIG. 5 shows a perspective view of a larger region of the assembly and FIG. 6 shows a detail from the illustration in FIG. 5. The first optical element 1 is transparent in FIG. 5.

Furthermore, the optical system comprises a second optical element 2, which is likewise basically plate-shaped. The second optical element 2 is composed at least in part of a transparent material, e.g., advantageously in terms of production, a plastic.

The second optical element 2 is parallel to the first optical element 1, disposed beneath the first optical element 1 in the example. The second optical element 2 has a light emitting region 21 for emitting light.

The light emitting region 21 is preferably formed on the large surface of the second optical element 2 lying opposite the first optical element, thus the surface of the second optical element 2 that faces downward here. The light emitting region 21 is configured such that it extends over a large portion of this surface, or is formed by this surface.

The light emitting region 21, or the surface facing downward, of the second optical element 2 is preferably planar. This makes it particularly easy to clean.

The light emitted from the light source 9 first arrives in the first optical element 1 and then in the second optical element 2, and finally exits the optical system via the light emitting region 21. In this regard, the optical elements 1, 2 can also be regarded as "waveguides."

The lateral edge region 11 of the first optical element 1 is configured to reduce the glare of the light, or to bundle the light, in the plane E. In other words, the edge region 11 is configured such that it reduces the aperture angle of the light emitted from the light source 9 lying in the plane E. For this, the edge region 11 may include numerous lens-like light entry regions 6, the lateral boundaries of which diverge in a direction extending away from the light source 9, in particular diverging in a convex shape. The LEDs 91 are preferably positioned very close to the light entry regions 6, such that a particularly large portion of the light emitted from the LEDs enters the first optical element 1 via the light entry regions 6.

In the example shown here, the light entry regions 6 are advantageously shaped, in terms of production technology, such that their contour remains unchanged in a direction perpendicular to the plane E.

The configuration is preferably such that in each case, one LED 91, or a specific number of LEDs 91, emits its light into a respective lens entry region 6. In the example shown here, two respective adjacent LEDs 91 emit light into one of the light entry regions 6.

The light entry regions 6 are preferably configured such that they form a row in a straight line, preferably such that they each border on one another directly. In particular, it can be provided that the light entry regions 6 extend over the entire length of the relevant edge of the first optical element 1. As a result, a particularly suitable light entry into the first optical element 1 is obtained.

Figure 3:
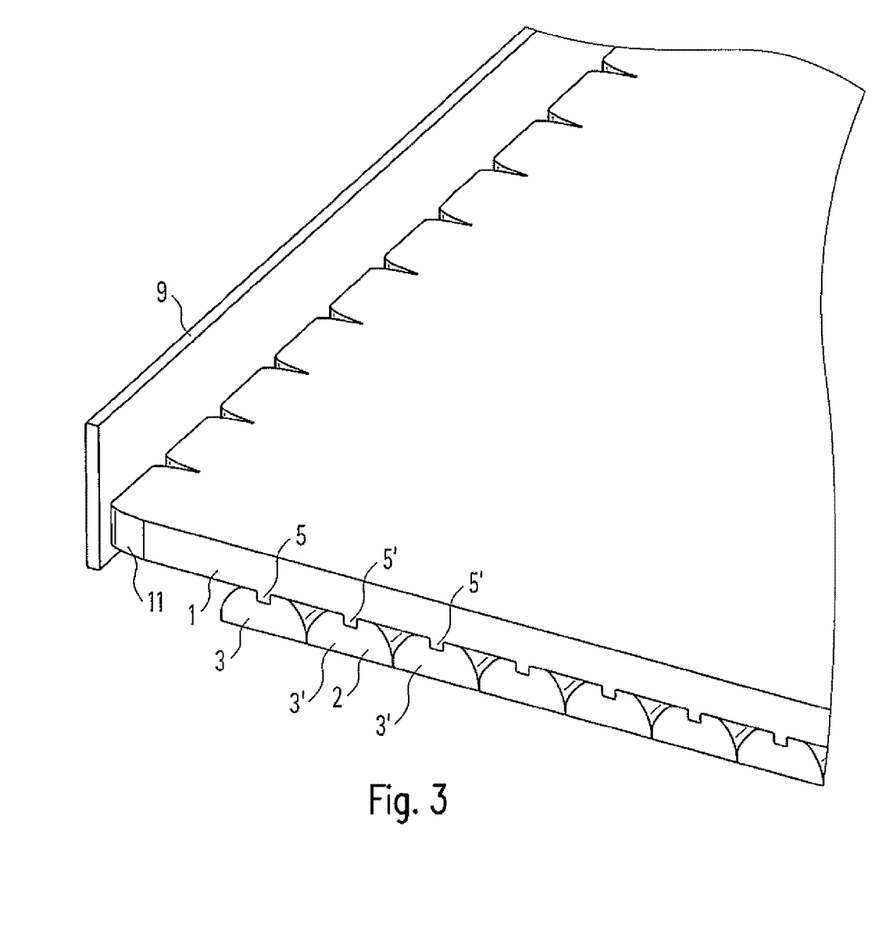
FIG. 3 shows a perspective illustration of a corner region of the assembly.
Figure 4:
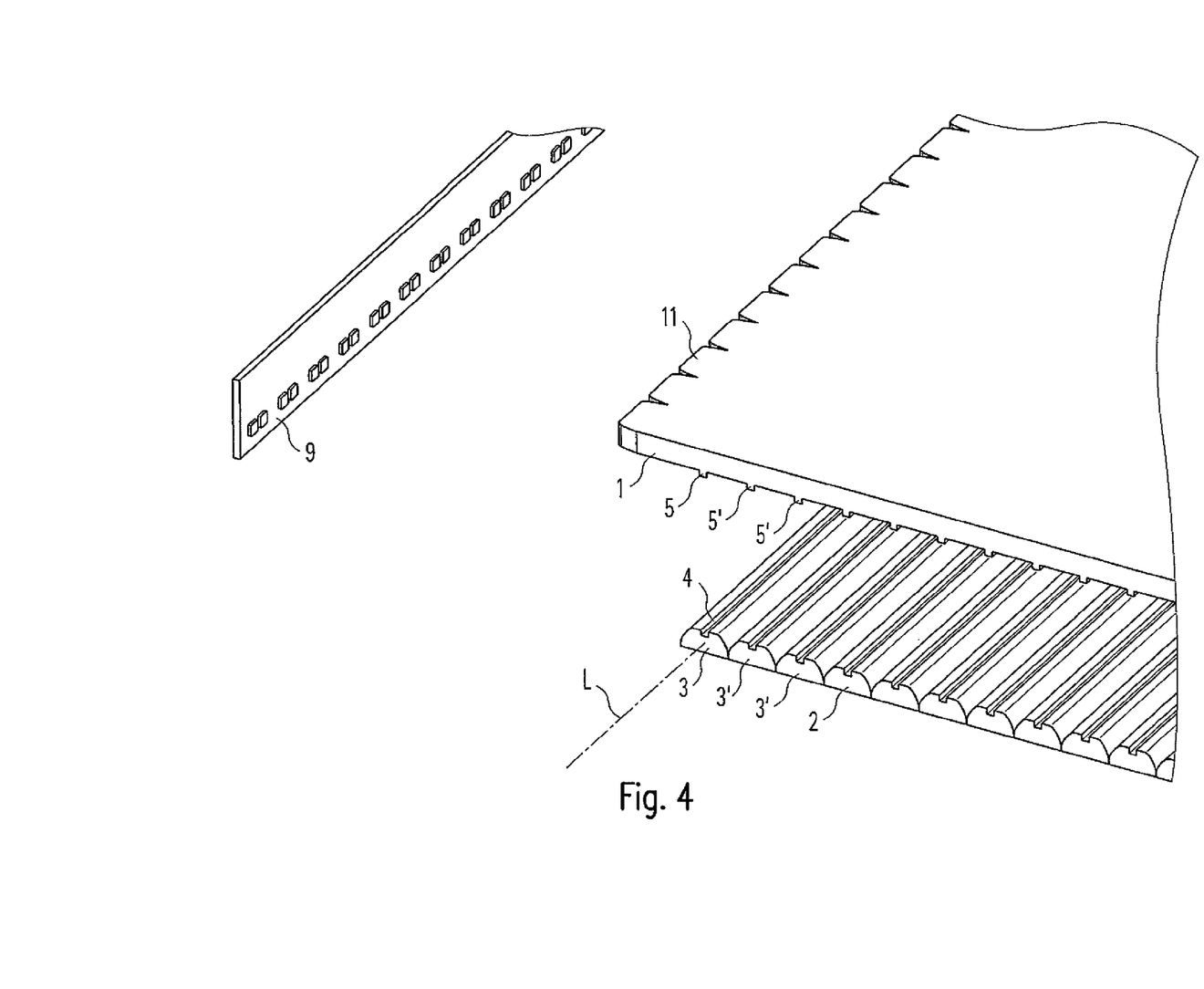
FIG. 4 shows an exploded view corresponding to FIG. 3.

FIG. 3 shows a perspective illustration of a corner region of the assembly, and FIG. 4 shows a corresponding illustration in an exploded view. The second optical element 2 has an elongated lens element 3, which extends along a longitudinal axis L, and is configured to reduce the glare, or bundle, the light in another plane E'—indicated in FIG. 2—which is substantially perpendicular to the first plane E. The other plane E' is thus parallel to the drawing plane of FIG. 1.

As a result of this configuration, the light is bundled, or the glare is reduced, in the two planes E, E' when it exits the assembly through the light emitting region 21. The expression, "at least substantially perpendicular," means, in particular, that the two planes E, E' form an angle between 80° and 90°. This is particularly advantageous, for example, when the assembly is used as a light source for a lamp, e.g. in the form of a ceiling lamp or hanging lamp.

In the example shown here, the lens element 3, or the longitudinal axis L, extends parallel to the lateral edge region 11, or parallel to the row of LEDs 91.

The lens element 3 preferably has a groove 4 extending parallel to the longitudinal axis L, which is configured for the light entry and is formed on a side of the second optical element 2 facing the first optical element 1, thus on the upper surface of the lens element 3 here.

The first optical element 1 preferably has an elongated structure 5 for emitting the light, that is parallel to the longitudinal axis L. The elongated structure 5 can be advantageously profiled in terms of production technology. In particular, the elongated structure 5 can be designed as an integral part of the rest of the first optical element 1.

The elongated structure 5 is preferably disposed such that it engages in the at least one groove 4. As a result, the light can be transferred from the first optical element 1 into the second optical element 2 with very little loss.

It is particularly easy to produce the second optical element 2 if the lens element 3 is molded, such that a profile axis extends parallel to the longitudinal axis L. Furthermore, the groove 4 extends advantageously over the entire length of the lens element 3. Accordingly, the elongated structure 5 is preferably at least as long, in particular exactly as long, as the groove 4.

Figure 8:
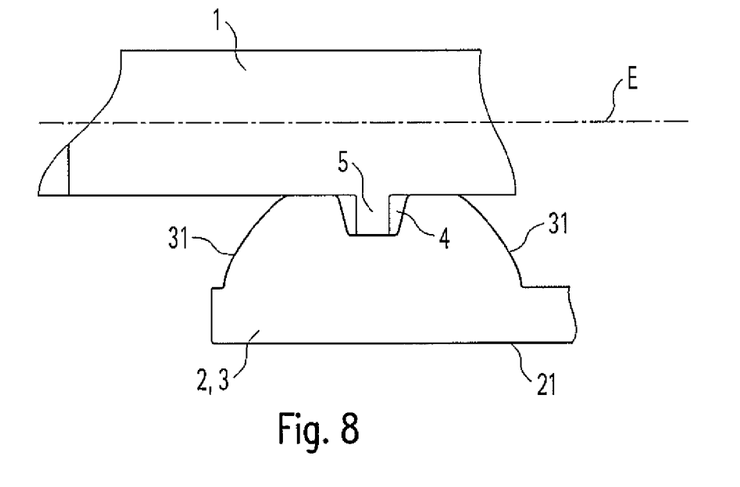
FIG. 8 shows a cross sectional illustration of a light transfer region between the two optical elements.

A detail of the illustration in FIG. 1 is shown in an enlargement in FIG. 8. The lens element 3 is shown accordingly in a cross section perpendicular to the longitudinal axis L. The lens element 3 has outer boundaries 31 that—seen in this cross section—diverge toward the light emitting region 21, wherein the outer boundaries 31 may have a concave shape, in particular. As a result, a particularly suitable bundling of the light in the other plane E' can be obtained.

The shape of the elongated structure 5—seen in a cross section perpendicular to the longitudinal axis L—is preferably at least approximately congruent to the shape of the groove 4. By way of example, the structure 5, as indicated in FIG. 8, can have a rectangular cross section. The groove 4 can likewise have a rectangular cross section, or—as illustrated—a trapezoidal cross section, as is advantageous regarding the positioning of the structure 5 in the groove 4. Other cross sections are also fundamentally possible here, e.g. a semicircle, etc.

The extension of the second optical element 2, when viewed parallel to the longitudinal axis L, preferably corresponds to the longitudinal extension of the lens element 4. In this case, the groove 4 advantageously extends in both directions to the edge of the second optical element 2.

As is indicated by a broken line in FIG. 2, the configuration is furthermore preferably such that—seen in a perpendicular projection onto plane E—the elongated structure 5 and the elongated lens element 3 overlap at least in part, in particular such that the elongated structure 5 lies within the projection of the at least one elongated lens element 3. As a result, light can be transferred particularly well from the first optical element 1 into the second optical element 2, making particularly good use of space.

The second optical element 2 preferably has numerous parallel, analogous, in particular structurally identical, lens elements 3, 3', and the first optical element 1 preferably has numerous parallel, analogous, in particular structurally identical, elongated structures 5, 5', wherein in each case, one of the lens elements 3, 3', is configured to interact, as described above, with precisely one of the elongated structures 5, 5'. Accordingly, the number of lens elements 3, 3' is preferably the same as the number of elongated structures 5, 5' with this configuration.

A very efficient light transfer can be obtained through the engagement of the elongated structures 5, 5' in the grooves 4 of the lens elements 3, 3'. Ideally, basically all of the light exiting the first optical element 1 via the structures 5, 5' can enter the second optical element 2 via the grooves 4.

The second optical element 2 can advantageously be composed of the lens elements 3, 3'.

As is shown in the example, the lens elements 3, 3' are configured such that the light emitting region 21 is formed by the surfaces lying opposite the grooves 4. Thus, the light emitting region 21 can cover a particularly large surface area in a coherent manner.

In accordance with the illustration in FIG. 1, the second optical element 2 has ten lens elements 3, 3'. There are significantly more in the embodiment shown in FIG. 9. As a rule, any number of lens elements 3 can be selected. The same applies with respect to the number of light entry regions 2 of the lateral edge region 11 of the first optical element 1. The illustrations in FIGS. 1 and 2 illustrate the principle of the optical system in this respect.

As indicated in FIG. 1, the configuration is furthermore such that, seen in a cross section perpendicular to the longitudinal axis L, the first optical element 1 extends closer to the light source 9 than the second optical element 2. By way of example, it may be provided that a spacing parallel to the plane E is formed between the second optical element 2 and the light source 9, which is, for example, at least as large as the corresponding width $\beta$ of the edge region 11, or the light entry region 6. By way of example, it may be provided that the following applies: $\beta < a < 5\beta$.

As a result, the light of the LEDs 91 is mixed to a certain extent before it enters one of the elongated structures 5, 5'. By this means it is possible to obtain an accordingly advantageous uniform mixing of the LED light. This is particularly relevant, for example, when the light from the LEDs 91 emitting light into one of the light entry regions 6 differs, e.g. with respect to the color or color temperature of the light. By way of example, it may be provided that in each case, two adjacent LEDs 91 emit their light into one of the light entry regions 6, wherein one of the LEDs 91 emits a cold white light, and the other LED 91 emits a warm white light. By activating the LEDs 91 accordingly, the color temperature of the light emitted by the assembly can be advantageously adjusted.

The elongated structures 5, 5' are preferably configured such—seen perpendicular to the longitudinal axis L—that they extend on both sides comparatively close to the edge of the optical element 1. This is advantageous regarding the formation of a particularly large light exit region 21. By way of example, it may be provided that, seen in this manner, the two edge structures 5, 5' are spaced apart from the corresponding edge of the first optical element 1 in each case, such that the spacing is smaller than three times the width β of the edge region 11, preferably smaller than twice the width β of the edge region 11.

As is illustrated in FIG. 1 or 9, for example, the assembly preferably also has a further light source 9', which is disposed opposite the first light source 9 in relation to the first optical element 1, wherein the configuration is analogous therewith with respect to emitting light into the first optical element 1. Accordingly, the first optical element 1 preferably has another corresponding edge region 11', analogous to the first edge region 11, lying opposite the first edge region 11, which serves to bundle, or reduce the glare of, the light emitted from the other light source 9' in the plane E.

As indicated in FIG. 1, the second optical element 2 preferably has a width b', which is somewhat smaller than the width b of the first optical element 1.

Alternatively, it may be provided, for example, that the assembly has a reflector element on a side of the first optical element 1 lying opposite the light source 9, which reflects the light back, thus increasing the efficiency.

Figure 10:
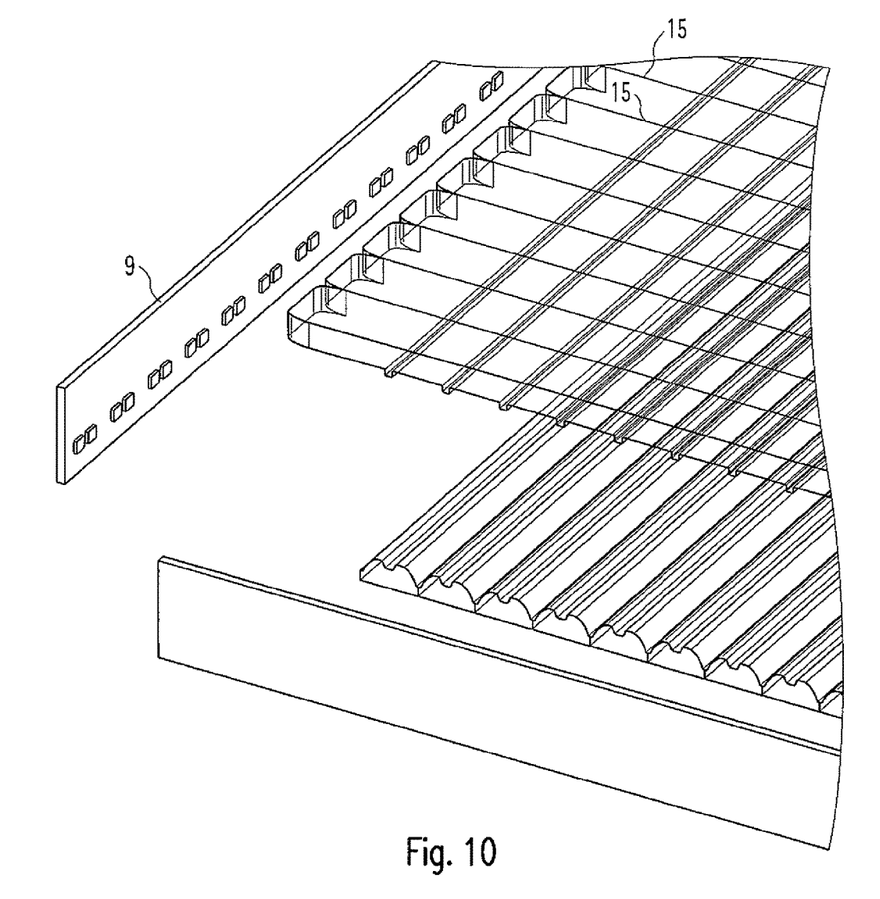
FIG. 10 shows a perspective illustration of a variation of the assembly, in an exploded view.

As is partially indicated in FIG. 10, it can also be provided in general that the assembly has four light sources, each of which is disposed on one of the four edges of the first optical element 1. In the illustrated variation, the first optical element 1 also has line structures 15 for generating a diffused light; the line structures 15 are preferably parallel to one another and perpendicular to the longitudinal axis L for this purpose. By way of example, the line structures 15 can be configured such that they each extend to one of the borders between two adjacent light entry regions 6, as can be derived from FIG. 10.

As can be derived from FIG. 4, the light source 9 can be configured such that the LEDs 91 are disposed in a repeating pattern. As a rule, the LEDs 91 can also be disposed in a non-uniform manner, such that the spacings between the LEDs 91 become larger toward the boundaries of the printed circuit board 92. With respect to obtaining a light distribution that is as uniform as possible, they can be disposed in the first optical element 1, e.g., in the manner of the four-sided light entry in the first optical element 1 specified above.

In the various figures, the elongated structures 5, 5' of the first optical element 1 are illustrated as elements that protrude from the undersurface of the first optical element 1. This is beneficial with respect to the high efficiency of the light transfer described above. Alternatively, instead of the protruding elements, the corresponding region of the undersurface of the first optical element 1 may merely be roughened, such that the light can exit the first optical element 1 here, and enter the second optical element 2. It should be noted thereby, that in general, a roughening of the surface counteracts the bundling of the light in the plane E to some extent. In this regard as well, the protruding structures 5, 5' are generally more advantageous.

As can be derived from FIG. 1, for example, it may be provided that the lens elements 3 all have identical structures, and are disposed at uniform spacings, e.g. directly adjacent to one another.

In general, it can however also be provided that the lens elements 3 are not disposed in a uniform manner, but instead are disposed—seen in a cross section perpendicular to the longitudinal axis L—in a decreasing density approaching the light source 9. This can be beneficial with respect to a uniform light emission of the assembly.

A similar effect can also be obtained in that the lens elements 3 are of different sizes, such that—seen in a cross section perpendicular to the longitudinal axis L—those closer to the light source 9 are smaller.

The same applies accordingly for the elongated structures 5, 5' of the first optical element 1. In other words, they can decrease in size or density as they approach the light source 9.

As is indicated in the right-hand side of the illustration in FIG. 1, the assembly can also have a reflector element 8, e.g. in the form of a highly reflecting film, disposed opposite the second optical element 2 with respect to the first optical element 1, in this case on the upper surface of the first optical element 1. This is generally beneficial in terms of efficiency.

The reflector element 9 is merely optional, however. By way of example, it may be provided that the assembly is constructed such that there are no other components of the assembly located above and below the two optical elements 1, 2, at least above or below a central region of the two optical elements 1, 2. When the assembly in accordance with this embodiment is used in a hanging lamp, it is possible to see through the two optical elements 1, 2 from below, to a ceiling above.

With this configuration, a light emitting region 21 can be obtained in particular, which has a particularly large surface area for the given width of the system. The system, or assembly, respectively, is also suitable for use with an overall comparatively limited width. It is also possible to obtain an overall comparatively larger light emitting region 21.

Another advantage of the configuration according to the invention is that the two optical elements 1, 2 can be produced relatively simply. By way of example, the first optical element 1 and/or the second optical element 2 can be made of plastic.

The two optical elements 1, 2 need only be placed on top of one another to obtain the intended functionality. No further mechanical connection is necessary, such as adhesives or suchlike.

Furthermore, because of the plate shape of the optical elements 1, 2, an overall low structural height of the optical system, and thus the overall assembly, can be obtained.

Because the elongated structures 5, 5' and the lens elements 3, 3' are parallel to one another, there is no Moiré effect at the light emitting region.

The assembly is particularly suitable for use in a lamp, e.g. a hanging lamp, a surface-mounted lamp, or a recessed lamp. It is not necessary to provide the assembly with a further cover or film, or suchlike.

The invention claimed is:

1. An optical system that influences a light emitted from a light source (9), comprising:
   a first optical element (1), which is plate-shaped, such that a plane (E) is established by the first optical element (1), wherein the first optical element (1) has a lateral edge region (11) through which light enters and a second optical element (2), which is plate-shaped, wherein the second optical element (2) is disposed parallel to the first optical element (1), and has a light emitting region (21) through which the light exits;

wherein the second optical element (2) has at least one elongated lens element (3), which extends along a longitudinal axis (L) in another plane (E'), which is at least substantially perpendicular to the first plane (E), and the first optical element (1) has at least one elongated structure (5) parallel to the longitudinal axis (L), through which light is emitted; and further wherein the at least one elongated lens element (3) has a groove (4) extending parallel to the longitudinal axis (L), through which light enters, formed on a side of the second optical element (2) facing the first optical element (1).

2. The optical system according to claim 1, in which the groove (4) extends in both directions to the edge of the second optical element (2).

3. The optical system according to claim 1, in which the at least one elongated lens element (3), when viewed in a cross section perpendicular to the longitudinal axis (L), has diverging outer boundaries (31).

4. The optical system according to claim 1, configured such that, when viewed in a perpendicular projection onto the plane (E), the at least one elongated structure (5) and the at least one elongated lens element (3) at least partially overlap, preferably such that the elongated structure (5) lies within the projection of the at least one elongated lens element (3).

5. The optical system according to claim 1, configured such that the elongated structure (5) is disposed such that it engages in the groove (4).

6. The optical system according to claim 5, in which, when viewed in a cross section perpendicular to the longitudinal axis (L), the shape of the elongated structure (5) is congruent to the shape of the groove (4).

7. The optical system according to claim 6, in which, when viewed in a cross section perpendicular to the longitudinal axis (L), the elongated structure has a rectangular shape.

8. The optical system according to claim 1, in which the second optical element (2) has numerous elongated lens elements (3, 3'), which are disposed parallel, and directly adjacent, to one another.

9. The optical system according to claim 8, wherein the first optical element has numerous elongated structures (5, 5') for emitting light, which are disposed parallel to one another, and each of the lens elements (3, 3') is dedicated to precisely one of the elongated structures (5, 5').

10. An assembly for emitting light, comprising
a light source (9) for generating a light, and
an optical system according to claim 1, wherein the assembly is such that the light generated by the light source (9) is influenced by the optical system.

11. The assembly for emitting light according to claim 10, in which the light source (9) is an LED light source.

12. The assembly for emitting light according to claim 10, furthermore comprising
at least one further light source (9'), wherein the light from the light sources (9, 9') enters the first optical element (1) from numerous sides.

13. The assembly for emitting light according to claim 10, furthermore comprising
a reflector element (8), disposed opposite the second optical element (2) with respect to the first optical element (1).

14. The optical system according to claim 1 wherein said lateral edge region (11) comprises numerous lens-like entry regions (6) that have lateral boundaries diverging in a direction extending away from the light source (9).

15. The optical system according to claim 1 wherein the plate-shaped first optical element is rectangular and planar, and the plate-shaped second optical element is rectangular and planar.

16. An optical system that influences a light emitted from a light source (9), comprising:
a first optical element (1), which is plate-shaped, such that a plane (E) is established by the first optical element (1), wherein the first optical element (1) has a lateral edge region (11) through which light enters, wherein said lateral edge region (11) comprises numerous lens-like entry regions (6) that have lateral boundaries diverging in a direction extending away from the light source (9), and
a second optical element (2), which is plate-shaped, wherein the second optical element (2) is disposed parallel to the first optical element (1), and has a light emitting region (21) on the side opposite of the first optical element through which the light exits;
wherein the second optical element (2) has at least one elongated lens element (3) on the side facing the first optical element, which extends along a longitudinal axis (L) in another plane (E'), which is at least substantially perpendicular to the first plane (E).

17. The optical system according to claim 16 wherein the plate-shaped first optical element is rectangular and planar, and the plate-shaped second optical element is rectangular and planar.

18. An optical system that influences a light emitted from a light source (9), comprising:
a first optical element (1), which is plate-shaped, such that a plane (E) is established by the first optical element (1), wherein the first optical element (1) has a lateral edge region (11) through which light enters from the light source (9), and
a second optical element (2), which is plate-shaped, wherein the second optical element (2) is disposed parallel to the first optical element (1), and has a light emitting region (21) on the side opposite of the first optical element through which the light exits;
wherein the second optical element (2) has at least one elongated lens element (3) on the side facing the first optical element, which extends along a longitudinal axis (L) in another plane (E'), which is at least substantially perpendicular to the first plane (E), and said at least one elongated lens element (3), when viewed in a cross section perpendicular to the longitudinal axis (L), has diverging outer boundaries (31).

19. The optical system according to claim 18 wherein the plate-shaped first optical element is rectangular and planar, and the plate-shaped second optical element is rectangular and planar.

* * * * *